March 22, 1966 C. O. FINN 3,241,173
MULTI-PURPOSE DEVICE
Filed Feb. 24, 1964 6 Sheets-Sheet 2
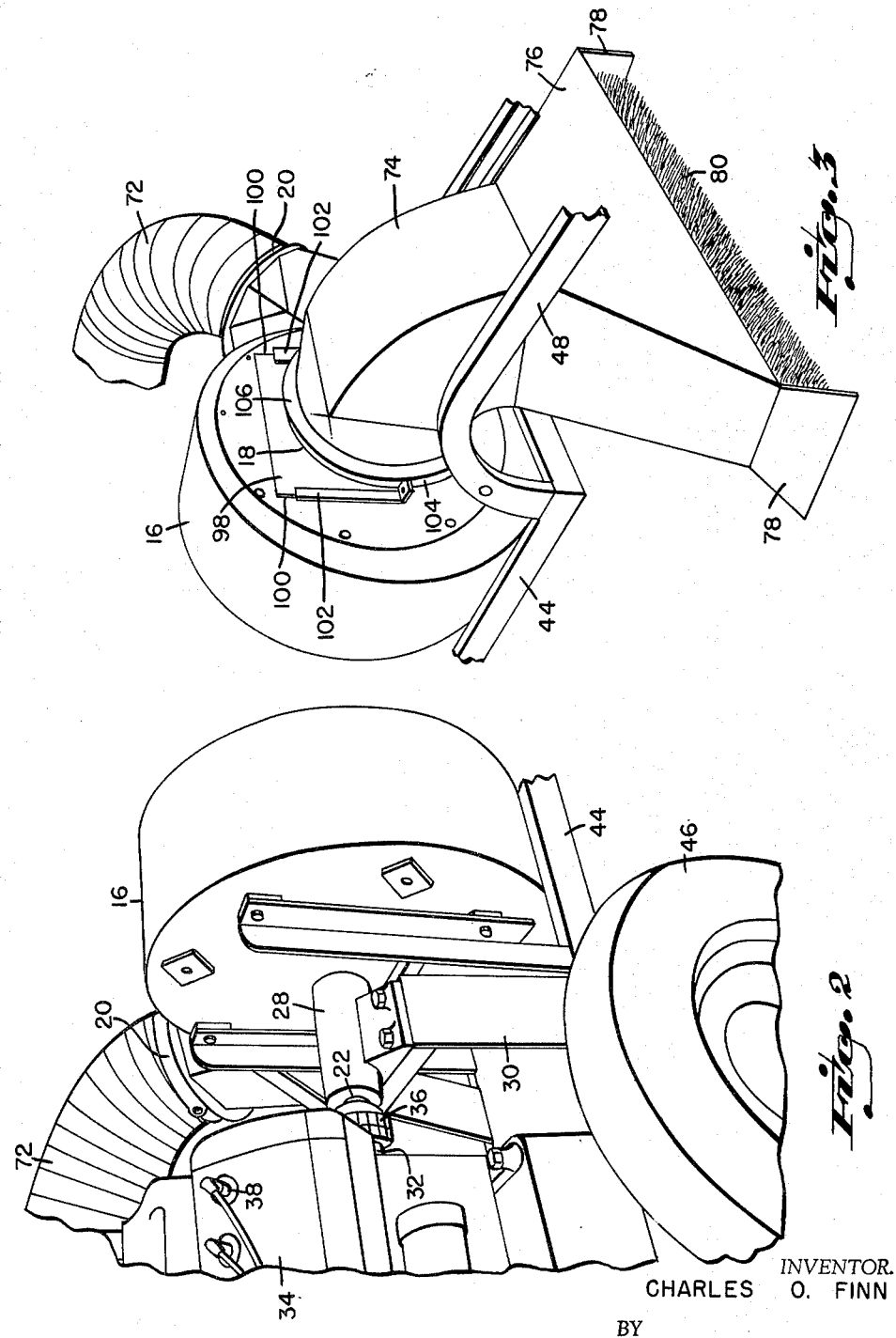
INVENTOR.
CHARLES O. FINN
BY
*J. Warren Kinney, Jr.*
ATTORNEY March 22, 1966  C. O. FINN  3,241,173
MULTI-PURPOSE DEVICE
Filed Feb. 24, 1964  6 Sheets-Sheet 3

INVENTOR.
CHARLES O. FINN
BY
J. Warren Kinney, Jr.
ATTORNEY

March 22, 1966 C. O. FINN 3,241,173
MULTI-PURPOSE DEVICE

Filed Feb. 24, 1964 6 Sheets-Sheet 4

INVENTOR.
CHARLES O. FINN
BY
J. Warren Kinney, Jr.
ATTORNEY

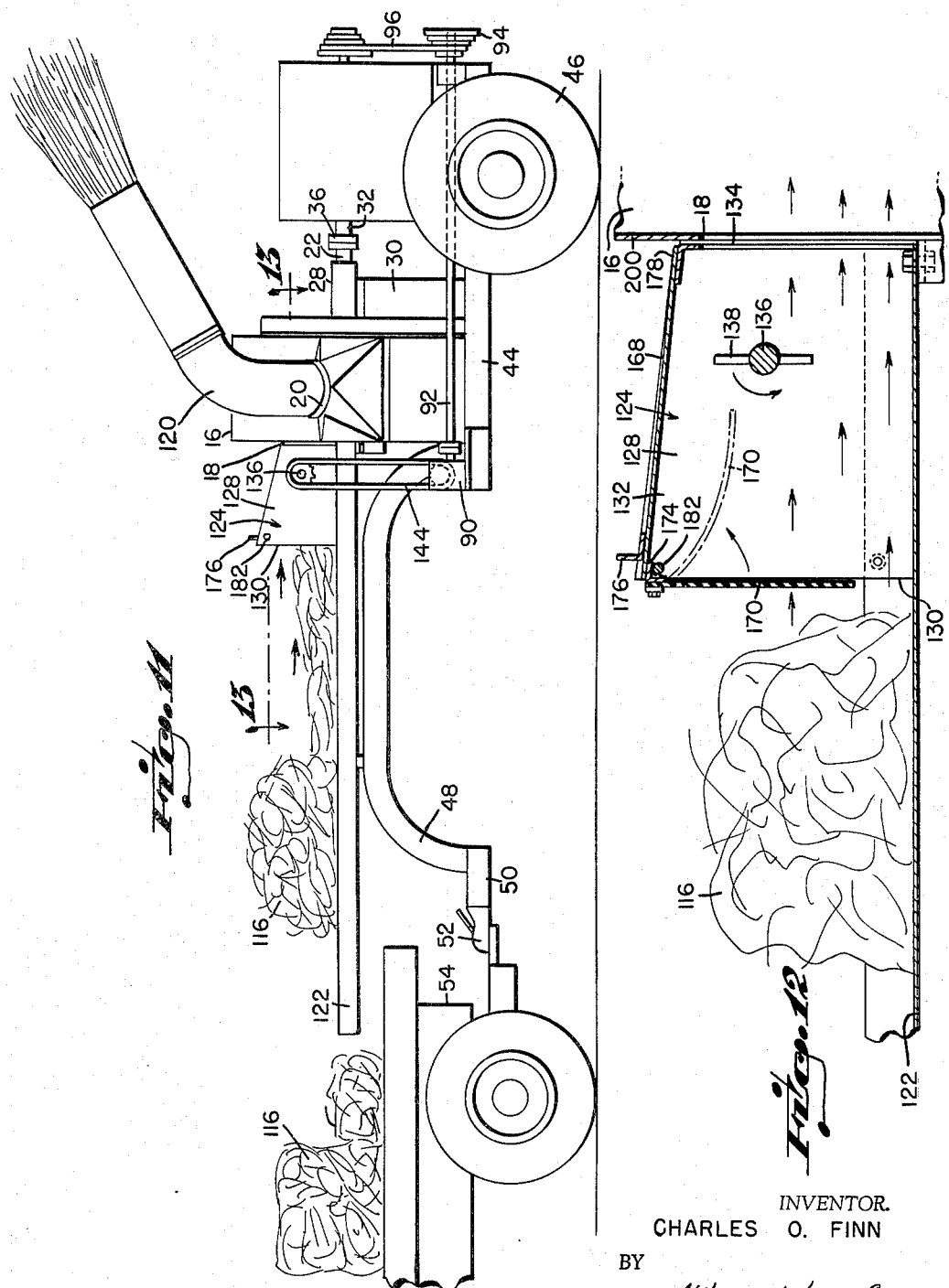

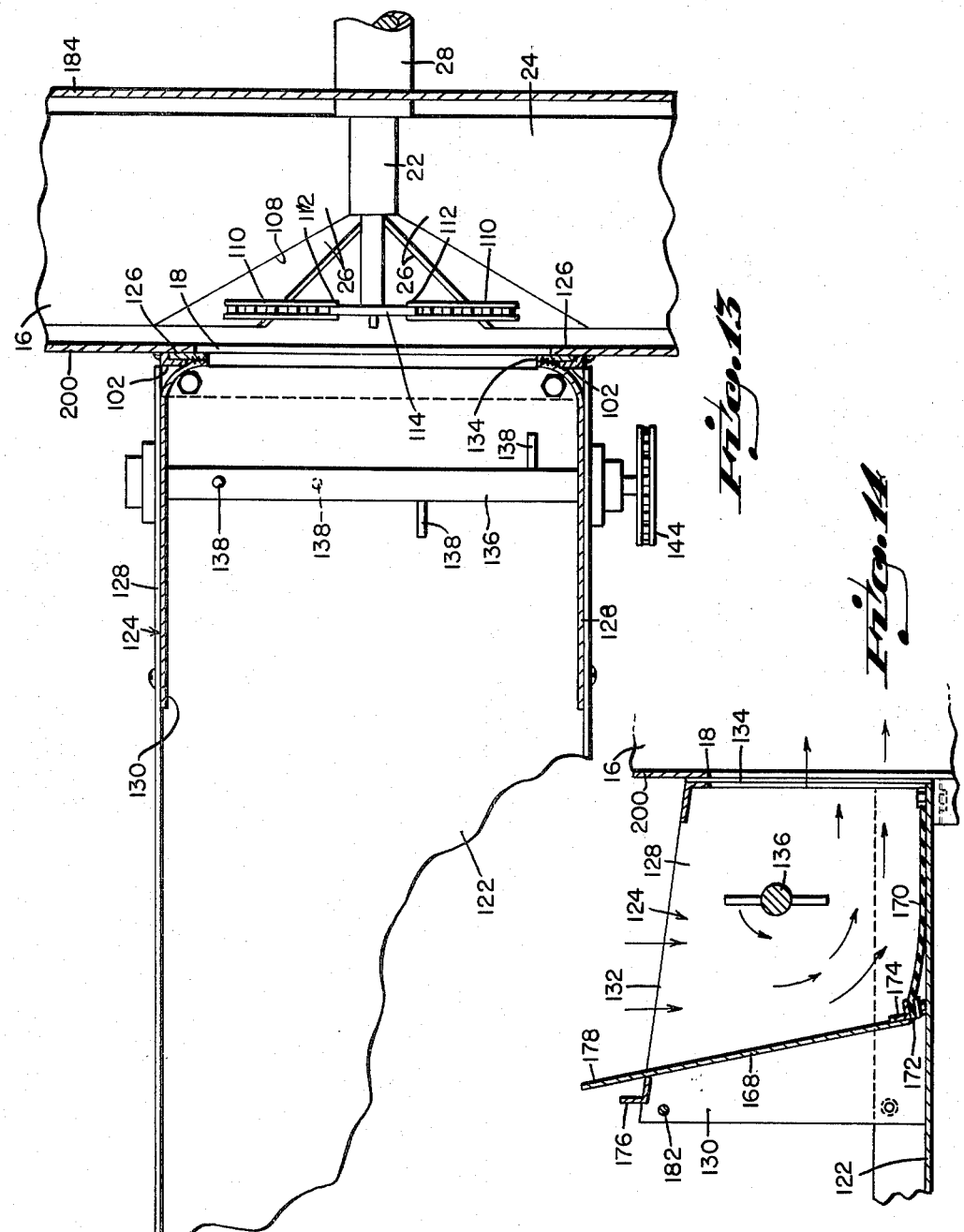

United States Patent Office 3,241,173
Patented Mar. 22, 1966

3,241,173
MULTI-PURPOSE DEVICE
Charles O. Finn, Cincinnati, Ohio, assignor to The Finn Equipment Company, Cincinnati, Ohio, a corporation of Ohio
Filed Feb. 24, 1964, Ser. No. 346,960
8 Claims. (Cl. 15—328)

This invention relates to a multi-purpose service vehicle, such as might be used in seeding, fertilizing, treating and otherwise maintaining lawns or other grass areas, including keeping such areas free of debris, litter and the like.

An object of the invention is to provide a multi-purpose vehicle for the purposes stated, which may be towed or otherwise moved onto or over an area to be serviced, and which may be quickly and easily converted for the performance of various types of service required for the proper care of extensive grass areas, lawns, and the like, during all seasons of the year.

More specifically, it is an object of the present invention to provide a vehicle or machine for the purposes stated, which utilizes principally a current of highly-velocity, high volume air in performing the services required.

Another object of the invention is to provide a machine for the performance of services as stated, which is simple and reliable in operation, and which may be used with safety and with great savings of time and labor.

A further object of the invention is to provide a service vehicle of the character stated, with simple and easily interchangeable accessories or attachments, including novel means of a simple nature for mounting and detaching such accessories or attachments.

The foregoing and other objects are attained by the means described herein and illustrated upon the accompanying drawings, in which:

FIG. 2 is a detail perspective view showing portions of the apparatus absent from FIG. 1.

FIG. 3 is a perspective view showing the apparatus adapted for pick-up of debris and the like from the ground.

FIG. 11 is a side elevational view of the apparatus of the invention, being towed by a truck and adapted for applying a mulch or other cover material to a lawn area.

FIG. 12 is an enlarged cross-section taken on line 12—12 of FIG. 10.

FIG. 13 is an enlarged cross-section taken on line 13—13 of FIG. 11.

FIG. 14 is a view similar to FIG. 12, showing the hopper of FIG. 12 converted for top-feeding of material to the apparatus.

Figure 1:
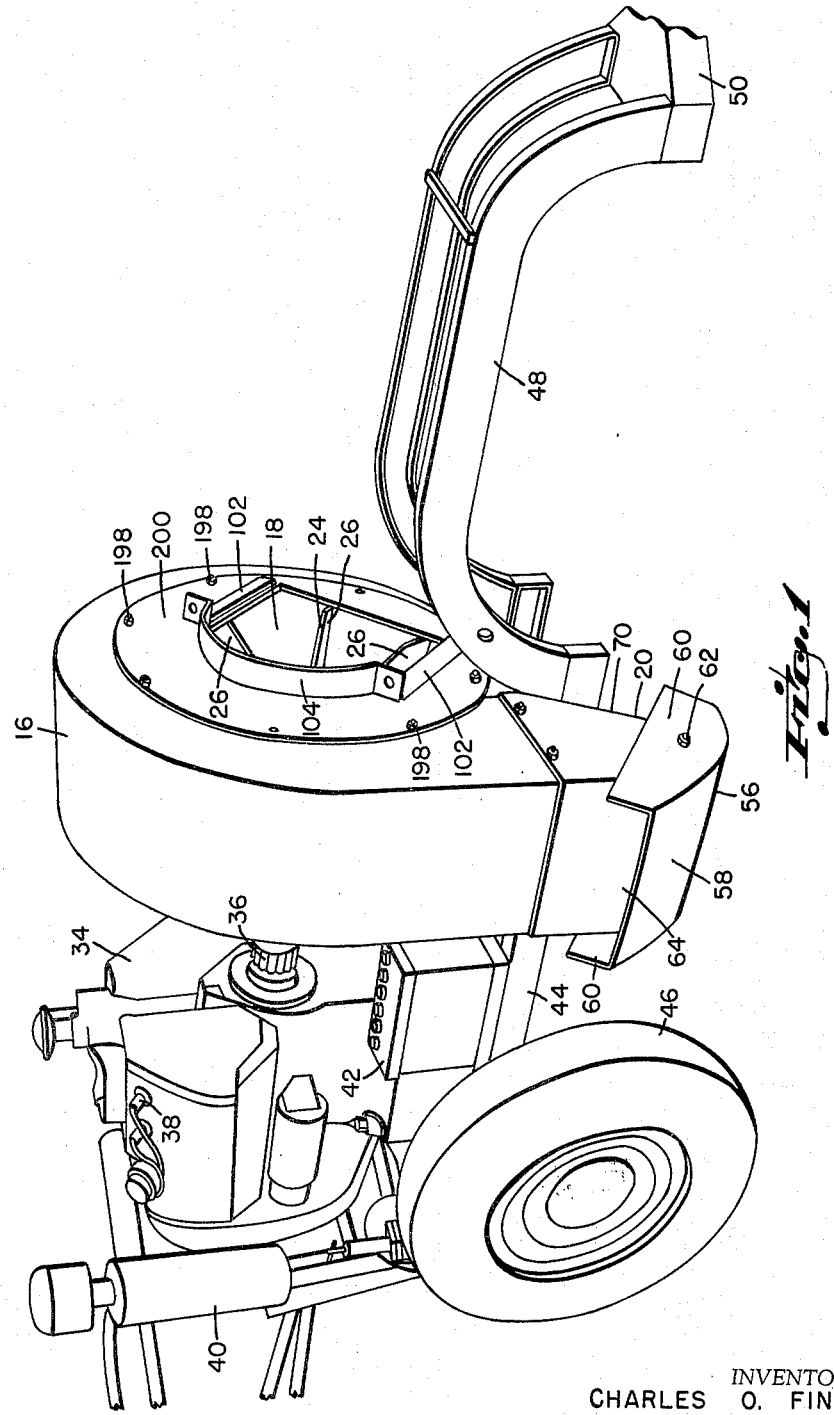
FIG. 1 is a perspective view of the multi-purposes service vehicle of the invention, as adapted for windrowing service.
Figure 4:
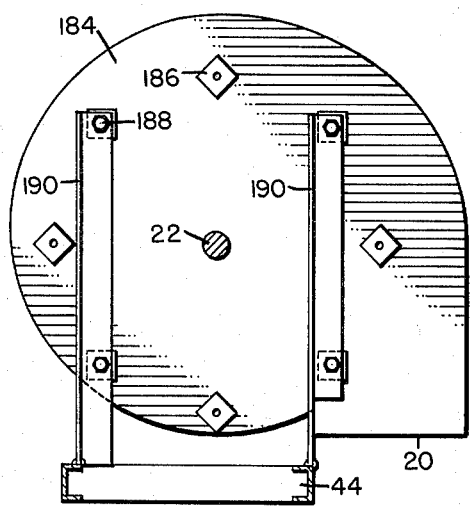
FIGS. 4, 5, 6 and 7 are detail elevations of a blower housing in various positions of adjustment.
Figure 5:
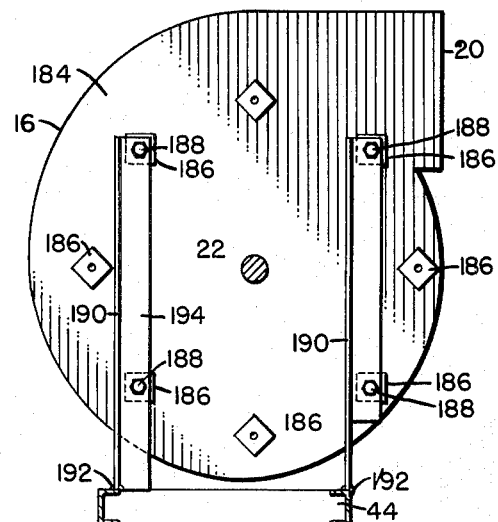
Figure 6:
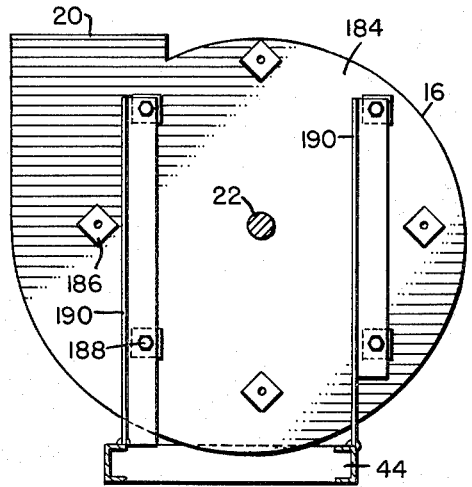
Figure 7:
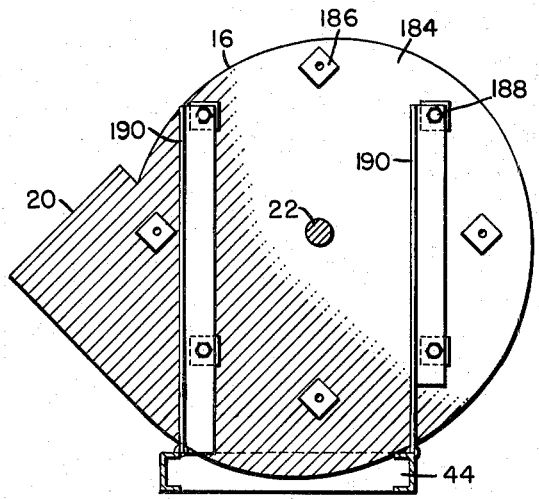

The device of this invention is for the use of attendants whose duties involve caring for parks, lawn areas, roadway medians and other areas of considerable size, which usually are to be maintained and serviced in the interests of beauty and safety. Such areas generally require almost constant servicing, particularly if they are large or extensive, and the cost of servicing has become a matter of great concern to governmental bodies or other institutions charged with the care, maintenance, or creation of such areas.

Heretofore, much of the servicing and landscaping of grassed areas has been performed either by manual labor, or with the use of a variety of machines each designed to perform a particular service such as sweeping, mulching, spraying, fertilizing, or the like. As the result of the current practice, some of the machines remained idle and required care and storage while others were in use. The practice became expensive and otherwise unsatisfactory, due to the need for multiple storage barns and the necessity for transporting the various types of machines from place to place, often at great distances, and with the need for employing a great number of attendants to move, service, and operate the various machines. Some of the machines employed were useful only during certain seasons of the year, or on infrequent occasions, and were idle at all other times, this resulting in expensive upkeep and obsolescence long prior to reaching the end of their normal service life.

An object of the present invention is to overcome the undesirable conditions above mentioned, by providing a multi-purpose service apparatus designed as a single machine for performing all types of work usually necessary for the care, maintenance, and creation of extensive grassed areas such as those referred to. The multi-purpose apparatus is so constructed as to be converted, with a minimum of labor and expense, for the performance of any normal service operation pertaining to the work mentioned, whether the nature of the work be seasonal or not, so that the apparatus may be kept on the job and in service practically without interruption, thereby eliminating the need for a multiplicity of special-service individual machines.

In the accompanying drawings, 16 indicates a blower housing having an air intake port 18, and a discharge port 20 tangent to the housing perimeter. A shaft 22 arranged transversely of the housing, carries a rotor or impeller 24 which includes a plurality of radial blades 26 to move a high-volume current of air into the intake port, for delivery through the discharge port. The impeller shaft is disposed off-center within housing 16, as is usual in blowers of the type disclosed, and may be supported for rotation in a bearing 28 secured to a fixed standard 30.

The impeller shaft 22 of the blower may be driven by the drive shaft 32 of a motor 34, through the intermediary of a coupling unit 36. The motor as herein disclosed by way of example, may be an internal combustion engine, some of the parts of which are identified as the spark plugs 38, muffler 40, and storage battery 42. The engine is supported upon the main frame or chassis 44 of a trailer vehicle having a pair of wheels 46.

A frame extension 48 fixed to main frame 44, may include a forward pad 50 having hitch means 52, whereby the trailer vehicle may be towed and moved over the ground by a truck 54 or other form of self-propelled vehicle. If the trailer vehicle is to be used at a particular location, or parked, it may be unhitched from the truck, and any suitable prop such as a jack, may be placed beneath pad 50 to support the forward end of the frame extension, thereby freeing the truck for other uses.

FIG. 1 shows the blower in use as a windrower. Here, the discharge port 20 is so disposed as to direct a blast of air vertically downwardly, and onto an adjustable deflector 56 which is shown in position to deflect the blast transversely of and horizontally beneath the frame 44. The effect of the deflected blast is to move loose debris lying upon the ground, and compile it in a row distant from the trailer vehicle as the vehicle is towed over the ground, usually in one general direction. After the debris has been so compiled, or windrowed, the accumulation may either be picked up, or moved again to form another windrow by making a subsequent pass with the blower vehicle. The windrowing operation may be repeated as often as may be necessary to warrant pick-up, or if practicable, to simply displace the debris from the area requiring clean-up.

Deflector 56 may be constructed of sheet metal in the form of a U-shaped open-ended tray having a bottom wall 58, and a pair of spaced parallel side walls 60, 60. Each side wall may be perforated to receive a bolt 62 or other pivot means connected to the housing of the discharge port, so that the deflector may be tilted about elements 62 to direct the air blast in either of two directions transversely of the path of advancement of the vehicle. The deflector bottom 58 may be arcuately formed, as shown, to ensure a substantially horizontal discharge of air from the blower. The fasteners 62 or any other appropriate means may be employed to fix the deflector in either of the two operative positions above mentioned.

Figure 8:
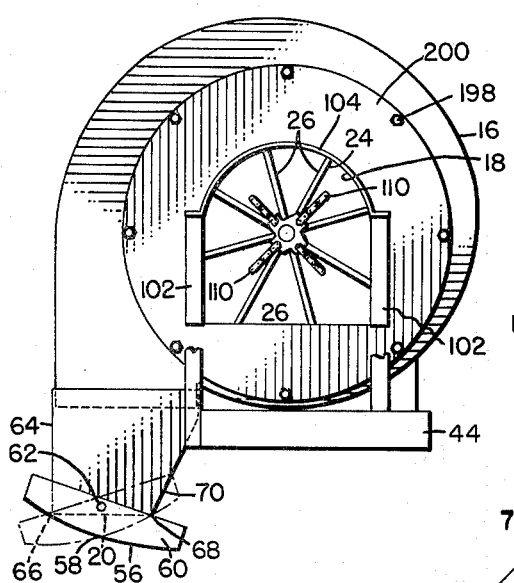
FIG. 8 is an end elevation of a blower housing as depicted by FIG. 1.

It should be understood that the opposite ends of the tray are open and unobstructed; however, when the tray is tilted as in FIG. 1 or 8, the straight lower edge of housing wall 64 may contact the tray bottom at 66 to prevent discharge of air upwardly along the bottom wall. Similarly, when the tray is tilted in the opposite direction as indicated by broken lines of FIG. 8, the lower edge 68 of wall 70 will seal against the tray bottom to preclude loss of air upwardly along the exterior of wall 70. During the windrowing operation, air enters the blower housing through intake port 18.

Figure 9:
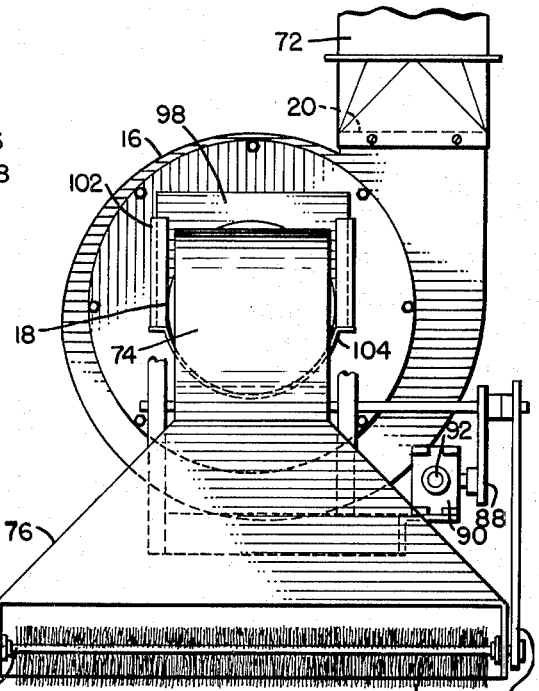
FIG. 9 is an end elevational view similar to FIG. 8, showing the device adapted for pick-up service as in FIG. 3.

FIGS. 3 and 9 illustrate a conversion of the apparatus for sweeping or pick-up duty. Here it will be observed that blower housing 16 has been rotated bodily about its impeller axis to place the discharge port 20 in a position to discharge in an upward, rather than a downward direction. The discharge through port 20 may be conveyed by means of an attached conduit 72, to a receptacle or to a remote location, as may be desired. In a typical arrangement, conduit 72 may be a flexible pipe delivering exhaust materials to a screened cage (not shown), which may be carried by frame extension 48 or by the towing vehicle 54, FIG. 11, for accumulating solids discharged through pipe or conduit 72.

In the arrangement of FIGS. 3 and 9, a detachable suction hood 74 is applied over intake port 18, the hood having a wide suction head 76 to closely approach the ground for picking up debris and directing it to housing 16. Head 76 may carry depending end walls 78, 78 which if desired, may support a horizontal broom 80 to sweep the ground. The broom may be of a type which is rotatable, if desired, and may comprise a horizontal shaft 82 supported for rotation in bearings 84 carried by end walls 78. The broom may be rotated in any appropriate manner, as by means of a belt or chain drive 86–88 associated with a gear box 90 which is driven by the power take-off shaft 92. Shaft 92 may be driven as in FIG. 11, by a pulley 94 having a belted drive connection 96 with motor shaft 32.

A quick-detachable connection is provided for mounting the suction hood upon blower housing 16. This may comprise a flat, rectangular adapter plate 98 secured to the upper end of hood 74 transversely thereof, said plate having upright side edge margins 100 slidably received in channeled parallel guides 102 fixed upon a face plate 200 of housing 16. Hood 74 may be detached from plate 200 for exposing intake port 18, by simply lifting it bodily upwardly to slide the adapter plate 98 from the upper ends of the guides. An arcuate cross-member 104 (FIG. 1) connecting the guides 102 and following the contour of intake port 18, limits insertion of adapter plate 98 into the guides, and effects a seal with the terminal ring 106 of the hood.

The sweeper attachment above described may be used to advantage in picking up loose objects and debris compiled by the windrower attachment of FIG. 1; however, windrowing is not essential to proper functioning of the sweeper attachment, as will be understood.

The sweeper attachment may quite often pick up and deliver to the blower housing various objects such as twigs, pieces of wood, cans, bottles, and other containers capable of damaging the blades of impeller 24. To avoid such damage, the impeller blades may be cut away along an oblique line as indicated at 108 of FIG. 13, and ahead of the blades may be located a plurality of flexible chain sections 110 to strike and throw outwardly such objects as may enter the intake port, before the objects can be struck by the impeller blades.

The flexible sections 110 may have inner ends mounted at 112 upon a disc 114 secured to the forward end of impeller shaft 22, in advance of the blade edges 108, so that any object of the kind mentioned above may be struck by the chains, and possibly fragmented or crushed thereby, in advance of being centrifuged toward the outer confining wall of housing 16 and discharged through conduit 72. By this means, the impeller is protected against possible damage.

Figure 10:
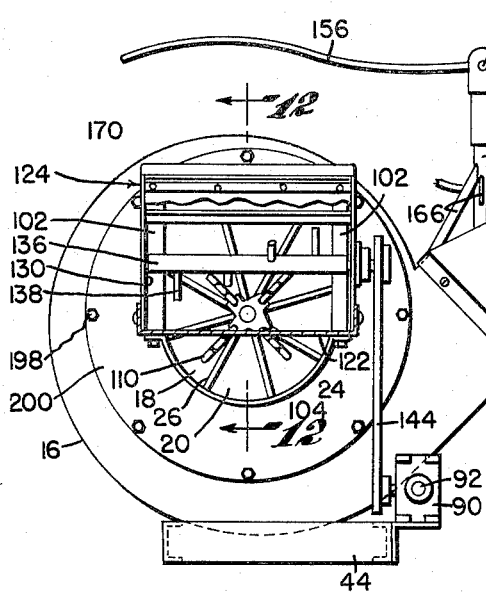
FIG. 10 is an end elevational view showing the apparatus of FIG. 8 adapted for applying various treating materials to a lawn area.

It must be understood that the chain sections 110 are limp, and will not be radially extended as in FIGS. 8 and 10 unless the impeller shaft is in rapid rotation.

It is sometimes desirable to apply to a ground area a mulch of chopped straw or the like, as a protective cover or treatment. In that event, the equipment may be converted according to FIGS. 10 to 14, wherein mulch material 116 fed in a mass or as a bale, or otherwise, is chopped or shreaded and then introduced into intake port 18 for delivery in airborne fashion, through a suitable conduit 120 which discharges to atmosphere. The conduit 120 may be rigid, as suggested by FIG. 11, or it may be flexible and dirigible according to FIG. 10. It is not necessary that the cover material be in bale form, as will be explained.

Referring to FIGS. 10 to 14, a platform 122 may be applied to frame extension 48, for supporting mulch material or the like 116. A shredding hopper 124 may be placed upon the platform adjacent to blower housing 16, to receive mulch material and direct it into the blower intake port. Hopper 124 may carry upright parallel flanges 126—126 (FIG. 13) to fit the guides 102 of the blower housing face plate, thereby effecting a quick-detachable connection between the housing and the hopper.

Hopper 124 may be in the form of a box having solid opposite side walls 128, a front opening 130, a top opening 132, and a rear opening 134. The flanges 126 maintain the rear opening 134 of the hopper in registry with blower intake port 18.

In spanning relationship to the hopper side walls 128, is a rotary shredder or beater shaft 136 having radial fingers 138 which shred and tear the mass of straw or mulch material fed thereto through hopper opening 130. As the material is shredded, it is drawn into the blower housing, and discharged by way of conduit 120 as an airborne mulch.

If desired, various admixtures may be incorporated in the discharge stream by means of injection nozzles 140, FIG. 10, such nozzles being supported on the discharge conduit and arranged to inject admixtures to the interior thereof. The nozzles 140 may be fed by means of flexible hoses 142 connected to a source of supply. The admixtures used may be selected insecticides, herbicides, fertilizers, and the like in liquid or powdered form. Fluid asphalt or similar bonding material is frequently injected into the discharge stream for the purpose of laying down a mulch or straw cover which will mat as it settles to the ground. The admixtures may be pumped to nozzles 140 using conventional means.

With reference to the shredder within hopper 124, the shredder shaft 136 may be rotated as indicated upon FIG.

11, by utilizing the gear box 90 and a sprocket and chain transmission means or the equivalent, indicated generally by the reference numeral 144.

The linkage illustrated at the top of FIG. 10, constitutes means for manually swinging the nozzle portion 146 of flexible conduit 120, to distribute the discharged material selectively over the area being treated. Such means may be referred to as a stream director, and may comprise a standard 150 fixed at its lower end to the frame 44, and carrying upon its upper end a rotatable head 152. The head has pivoted thereto at 154, an elongate handle 156. One end of the handle at 158 may be pivoted to one end of a connecting link 160, the opposite end of which link is pivoted at 162 to an encircling band or collar 164 fixed to and surrounding the nozzle portion of conduit 120.

By depressing the free end of handle 156, link 160 will be caused to elevate nozzle 146 for directing the discharge therefrom upwardly. Upward lifting of the handle of course directs the discharged stream at a downward inclination, and lateral swinging of the handle permitted by rotatable head 152, enables the operator to direct the stream in all lateral directions. Thus, the straw or mulch cover may be directed onto selected areas of the ground undergoing treatment, according to the will or judgment of an operator or attendant. The character 166 on FIG. 10 indicates braces for standard 150.

Reverting to FIG. 12, it may be noted that the forward opening 130 of hopper 124 is partly closed by a flexible depending curtain 170, which may be displaced to the broken line position shown, as material 116 is pushed horizontally into the hopper. The curtain serves to maintain a strong force of suction for drawing the material 116 toward shredder 138 and into the blower housing. When the hopper is used as in FIG. 12, it is desirable that the top opening 132 of the hopper be closed, and this is accomplished by means of a closure plate 168.

On the other hand, if the hopper is to be top-fed, in accordance with FIG. 14, the forward opening 130 thereof is desirably to be closed, using the closure plate 168, preferably. This dual use of the closure plate is attained by providing one edge thereof with an angle member 174, to which is secured one edge 172 of curtain 170. When the assembly 168–170 is used as in FIG. 14, curtain 170 rests idly upon platform 122 within the confines of the hopper, while plate 168 rests in an inclined position against a cross-member 176 which connnects the hopper side walls near opening 130.

When the curtain assembly 168–170 is to be used according to FIG. 12, in connection with horizontal feeding of the hopper, the free end 178 of plate 168 rests upon a forward cross-member 180 of the hopper, while angle member 174 rests upon a cross-member 182 of the hopper. Member 182 may be a rod as shown, having opposite ends secured to the hopper side walls, and extending in spaced parallelism with forward cross-member 176; the spacing being such that plate end 178 may be inserted between members 176 and 182 in disposing plate 168 to the top closing position of FIG. 12. Member 182 therefore supports one end of closure plate 168, while holding the curtain 170 in suspension. The arrangement provides for quick and easy conversion of the hopper for front or top feeding. Top feeding may be preferred when the hopper is to be fed by shoveling or otherwise transferring material into the hopper from a truck, for example, located alongside the service vehicle.

From the foregoing explanation, and in view of the several conversions possible in the use of the machine, it is evident that blower housing 16 shall be adjustable about its impeller shaft 22 to the several positions depicted by FIGS. 4 to 7. In a preferred construction, the solid rear or main wall 184 of the blower housing is provided with a series of fastener elements 186, herein shown as square internally threaded pads or nuts which may be welded or otherwise secured flatwise upon main wall 184. Elements 186 are adapted to detachably receive cooperative fastener elements, which may be in the form of threaded bolts or screws 188.

Nuts 186 are fixed upon wall 184 of the blower housing at locations equidistant from the axis of impeller shaft 22, and are spaced equidistantly from one another on a circle concentric with the impeller shaft.

At 190 are indicated two parallel upright supports or standards, which at their lower ends have rigid connections 192 with frame 44, the connections being welds or any appropriate equivalent suitable for anchorage purposes. The supports 190 are spaced apart a distance approximating the distance across alternate ones of the fastener elements or nuts 186. Supports 190 may be in the form of angle irons, corresponding legs 194 of which may be drilled or perforated to loosely receive the fasteners or screws 188. The perforations of the supports 194 may be spaced apart a distance equal to the distance across alternate ones of the nuts 186, so that screws such as 188 may be passed through the supports to engage alternate nuts 186 for securing the blower housing rigidly to the upright supports.

Upon removal of the screws 188, blower housing 16 may be detached from supports 190 and then rotated bodily about shaft 22 in increments of 45 degree arcs, thereby making possible a disposition of discharge port 20 to any of the adjusted positions depicted by FIGS. 4 to 7. Such adjustments correspond with the conversions illustrated by FIGS. 1, 3, 9, 10 and 11.

If and when additional adjustments are required, these may be attained by removing the circle of screws 198 (FIG. 1), and bodily rotating to various positions the face plate 200 of the blower housing, which plate carries the guide members 102 and 104 flanking the air inlet port. By this arrangement, guide members 102 may be indexed relative to the direction of discharge of outlet port 20.

From the foregoing explanation, it should be evident that the apparatus of the invention is adapted to perform a variety of services, thereby eliminating the need for a multiplicity of separate single-purpose machines which are much more expensive to acquire and maintain. Conversion of the apparatus for performance of the multiple services it is capable of rendering, is very simply accomplished with desirable ease and dispatch.

It is to be understood that various modifications and changes may be made in the structural details of the apparatus, within the scope of the appended claims, without departing from the spirit of the invention.

What is claimed is:

1. A multi-purpose service apparatus for preparing and maintaining lawn areas, comprising in combination: a vehicle including a tractional frame, a blower on the frame including a substantially cylindrical drum-like hollow housing having a rear wall, a front wall apertured to provide a port for air intake, and a side wall having a port for air discharge, means for selectively positioning the blower housing in several bodily rotated positions, a rotary multi-blade impeller within the housing for moving a current of air through said ports, a shaft normal to the front wall, means fixing the impeller upon the shaft, means for rotating the shaft and the impeller fixed thereon, a disc fixed upon the shaft intermediate the impeller and the intake port, flexible means secured to the peripheral portion of said disc for mutilating and centrifuging objects entering the intake port with the incoming air, before such objects reach the blades of the impeller, and means for gathering from a lawn area and directing into the intake port, debris including such objects mentioned, while the vehicle traverses said lawn area 2. The apparatus as set forth in claim 1, wherein the flexible means aforesaid comprises a plurality of flexible chain sections each having an inner end anchored for movement with the impeller shaft, and an outer end free to extend radially of the shaft under the influence of centrifugal force generated by rapid rotation of the shaft.

3. A multi-purpose service apparatus for preparing and maintaining lawn areas, comprising in combination: a vehicle including a tractional elongate frame, a blower on the frame including a substantially cylindrical drum-like hollow housing having a rear wall, a front wall apertured to provide a port for air intake, and a side wall having a port for air discharge, a rotary impeller within the housing for moving a current of air through said ports, means on the frame for rotating said impeller, quickly interchangeable attachments alternatively attachable to said blower housing in covering relation to the intake port, for suction-lifting loose debris from the lawn area, or for introducing lawn treating material into the intake port for exhaust through the discharge port, means selectively positioning the housing for shifting the discharge port to exhaust air from the housing in selected directions transversely of the tractional frame, conduit means including a dirigible nozzle associated with the discharge port, for broadcasting air-borne material exhausted through said discharge port, and means for attaching the attachments including channeled parallel guides fixed adjacent the inlet and a cross member connecting the guides and forming a seal and stop for the attachments.

4. The combination as set forth in claim 3, wherein is included injection means near the nozzle, for introducing additives to the exhaust stream in advance of discharge through the nozzle.

5. A multi-purpose service apparatus for preparing and maintaining lawn areas, comprising in combination: a vehicle including a tractional elongate frame, a blower on the frame including a substantially cylindrical drum-like hollow housing having a rear wall, a front wall apertured to provide a port for air intake, and a side wall having a port for air discharge, a rotary impeller within the housing for moving a current of air through said ports, means on the frame for rotating said impeller, a platform supported by the frame and having an end terminating near the intake port, a hopper resting upon the platform and having open front and rear ends, and an open top, said open top and open front having substantially like dimensions, and quick-detachable means for mounting the hopper upon the front wall of the blower housing with the rear opening of the hopper in register with the intake port of the blower housing, a detachable closure plate in one position being adapted to close the top opening and leave the front open, and in another position being adapted to close the front opening and leave the top open, for feed of material into the hopper, means for shifting the discharge port to exhaust air and material fed through the hopper, in selected directions transversely of the tractional frame, and a conduit associated with the discharge port to distribute air-borne material fed to the intake port through the hopper.

6. The apparatus as set forth in claim 5, wherein a driven rotary shredder is incorporated in the hopper near the rear opening thereof, to shred lawn treatment material fed into the hopper for entry into the intake port of the blower housing.

7. A multi-purpose service apparatus for preparing and maintaining lawn areas, comprising in combination: a vehicle including a tractional elongate frame, a blower on the frame including a substantially cylindrical drum-like hollow housing having a rear wall, a front wall apertured to provide a port for air intake, and a side wall having a port for air discharge, a rotary impeller within the housing for moving a current of air through said ports, means for rotating said impeller, a platform supported by the frame and having an end terminating near the intake port, to carry lawn treatment material, a hopper overlying said platform end, the hopper having open front and rear ends, and an open top, quick-detachable means for mounting the hopper detachably upon the blower housing with the rear opening of the hopper in register with the intake port of the blower housing, a hopper closure element comprising a rigid plate having opposite ends, and a flexible curtain secured along one end of the closure plate to depend therefrom when the plate is horizontally disposed, and means on the hopper for displaceably supporting the plate in covering relation to the hopper top opening, with the flexible curtain depending in substantial closing relation to the hopper front opening, said curtain being displaceable into the hopper incident to a feeding of material from the platform through the front opening of the hopper.

8. The combination as set forth in claim 7, wherein the closure element plate and curtain are narrower than the width of the hopper, whereby the plate may be inserted into the hopper in closing relationship to the hopper front opening, while the curtain rests flatwise within the hopper in parallelism with the platform, leaving the top opening of the hopper exposed.

References Cited by the Examiner

UNITED STATES PATENTS

| | | | |
|---|---|---|---|
| 1,900,213 | 3/1933 | Wenberg | 302—37 |
| 1,961,167 | 6/1934 | Riebel | 15—330 X |
| 2,561,882 | 7/1951 | Patton | 15—340 X |
| 2,590,734 | 3/1952 | Strong | 56—501 |
| 2,669,078 | 2/1954 | Gregory | 56—501 |
| 2,844,914 | 7/1958 | Finn | 275—2 X |
| 2,952,492 | 9/1960 | Finn | 302—36 |
| 3,163,471 | 12/1964 | Williams | 302—37 |

FOREIGN PATENTS

| | | |
|---|---|---|
| 674,500 | 10/1929 | France. |
| 526,749 | 5/1955 | Italy. |
| 856,640 | 12/1960 | Great Britain. |
| 310,380 | 12/1955 | Switzerland. |

ROBERT W. MICHELL, *Primary Examiner.*